United States Patent
Davies

(10) Patent No.: US 9,969,485 B2
(45) Date of Patent: May 15, 2018

(54) INCEPTOR AND METHOD FOR OPERATING AN INCEPTOR

(71) Applicant: BAE SYSTEMS plc, London (GB)

(72) Inventor: Robin William Davies, Rochester (GB)

(73) Assignee: BAE SYSTEMS Plc, London (GB)

( * ) Notice: Subject to any disclaimer, the term of this patent is extended or adjusted under 35 U.S.C. 154(b) by 65 days.

(21) Appl. No.: 14/901,747

(22) PCT Filed: Jun. 27, 2014

(86) PCT No.: PCT/GB2014/051969
§ 371 (c)(1),
(2) Date: Dec. 29, 2015

(87) PCT Pub. No.: WO2015/001320
PCT Pub. Date: Jan. 8, 2015

(65) Prior Publication Data
US 2016/0355251 A1    Dec. 8, 2016

(30) Foreign Application Priority Data

Jul. 1, 2013    (EP) ..................................... 13275148
Jul. 1, 2013    (GB) .................................. 1311748.6

(51) Int. Cl.
*B64C 13/10*    (2006.01)
*B64C 13/04*    (2006.01)
*B64C 13/22*    (2006.01)

(52) U.S. Cl.
CPC .............. *B64C 13/10* (2013.01); *B64C 13/04* (2013.01); *B64C 13/22* (2013.01)

(58) Field of Classification Search
CPC ................................ B64C 13/10; B64C 13/22
(Continued)

(56) References Cited

U.S. PATENT DOCUMENTS 5,062,594 A    11/1991    Repperger
2003/0226937 A1    12/2003    Einthoven et al.
(Continued)

FOREIGN PATENT DOCUMENTS

EP    1977970 A2    10/2008
WO    2005044622 A2    5/2005
(Continued)

OTHER PUBLICATIONS

International Search Report and Written Opinion received for Patent Application No. PCT/GB2014/051969, dated Sep. 25, 2014. 8 pages.
(Continued)

*Primary Examiner* — Thomas G Black
*Assistant Examiner* — Wae L Louie
(74) *Attorney, Agent, or Firm* — Finch & Maloney PLLC

(57) ABSTRACT

An inceptor apparatus (10) for controlling a vehicle, in particular an aircraft comprises a control stick (15) for operation by a user and a user feedback generator (28) coupled to the control stick and configured to receive signals from a vehicle condition indicator (40) remote from the inceptor apparatus. The apparatus also has a first vehicle condition sensor (54,56) dedicated to the operation of the inceptor apparatus. In a first mode of operation, the user feedback generator (28) is operable to generate tactile feedback to the user via the control stick in dependence upon signals received from the vehicle condition indicator (40). In a second mode of operation, in the event that no signal is received from the vehicle condition indicator (40), the user feedback generator (28) is operable to generate tactile feedback to the user via the control stick in dependence upon signals received from the first vehicle condition sensor (54,56).

20 Claims, 2 Drawing Sheets

(58) Field of Classification Search
USPC .............................. 701/3, 301; 244/221, 223
See application file for complete search history.

(56) References Cited

U.S. PATENT DOCUMENTS

| | | | |
|---|---|---|---|
| 2009/0125166 A1* | 5/2009 | Johnson | B64C 13/10 701/3 |
| 2009/0178502 A1* | 7/2009 | Kern | G05G 5/03 74/471 XY |
| 2009/0229396 A1 | 9/2009 | Taylor et al. | |
| 2010/0188267 A1* | 7/2010 | Hanlon | B64C 13/10 341/20 |
| 2012/0205494 A1* | 8/2012 | Taylor | B64C 13/46 244/223 |
| 2012/0253561 A1* | 10/2012 | Ellis | G05D 1/0858 701/3 |
| 2013/0074631 A1* | 3/2013 | Hanlon | B64C 13/04 74/471 XY |
| 2016/0355251 A1* | 12/2016 | Davies | B64C 13/04 |

FOREIGN PATENT DOCUMENTS

| | | |
|---|---|---|
| WO | 2007132267 A1 | 11/2007 |
| WO | 2015001319 A1 | 1/2015 |
| WO | 2015001320 A1 | 1/2015 |

OTHER PUBLICATIONS

GB Intellectual Property Office Search Report under Section 17(5) received for GB Patent Application No. 1311748.6 dated Dec. 20, 2013. 3 pages.

Extended European Search Report received for EP Patent Application No. 13275148.8 dated Dec. 10, 2013. 4 pages.

International Preliminary Report on Patentability received for Patent Application No. PCT/GB2014/051969, dated Jan. 14, 2016. 6 pages.

* cited by examiner

INCEPTOR AND METHOD FOR OPERATING AN INCEPTOR

The present disclosure relates to an inceptor apparatus.

During the cruise phase of a flight, aircraft are normally flown by a fully automatic control system. However, it is possible that system failures will occur which will require the flight crew (i.e. the pilots) to take over manual control of the aircraft without any prior warning.

Failures that affect the operation of the automatic control systems should be accompanied by a number of warnings and alerts to make the flight crew aware of the situation. However, these situations only occur very rarely and as a result the flight crew are not used to dealing with them. Under these circumstances the flight crew will be under a lot of stress and incorrect decisions can easily be made.

In particular, for aircraft that are fitted with passive side stick controllers (i.e. inceptors or "joy sticks"), a pilot, if not fully aware of the aircraft attitude or speed can inadvertently make manual control inputs that can easily result in a stall condition as the automatic systems that are designed to prevent this happening may have also failed and the pilot may not be aware of this.

There are currently two types of side stick controllers in use that provide pilot inputs (pitch and roll commands) into an aircrafts' Flight Control System (FCS). One type is "passive" and the other is "active".

Passive inceptors have fixed force/feel characteristic that are provided by springs and dampers, but do not provide tactile cues about the airplane current situation to the pilots. Flight control systems that use passive side sticks rely on the flight control laws within the airplane's Flight Control Computer (FCC) to keep the aircraft within a safe operating envelope. That is, the Flight Control System does not allow the airplanes' limits to be exceeded, whatever inputs the pilots apply to the system via the side sticks. This is sometimes referred to as "carefree" handling.

Active inceptors are more complex. In addition to springs and dampers that are used to provide a reversionary force/feel characteristic, they also have a servo-actuator mechanism that allows the force/feel characteristic of the stick to be continuously modified throughout a flight.

For both types of side sticks, under normal operating conditions the safe operating envelope of the airplane is commonly protected primarily by flight envelope protection features that are defined by the Flight Control Computer. Under abnormal operating conditions (in the presence of failures) the Flight Control System may have degraded to a level whereby the Flight Control Computer is no longer able to provide the required level of protection.

In the event that the primary level of protection provided by the Flight Control Computer is lost, reliance is currently placed on additional warning systems, for example stall warnings to inform the pilot that safe limits are being exceeded via audible and visual cues (lights and buzzers) and, in the case of conventional inceptors and active side sticks, via tactile feedback through the pilots hands via a stick shaker function. These systems are designed to inform the pilots of an impending danger, but they do not aid the pilots in making the correct decision or prevent them from making the wrong decision.

In certain scenarios, the pilots may not be aware that the envelope protection features provided the Flight Control Computer have been lost. That is to say, the Flight Control System has degraded from a Normal Mode of operation to a Backup Mode of operation. This may result in the pilots providing inputs into the Flight Control System that result in a stall condition that the pilots may not have time to recover from.

Hence a vehicle control system with a failsafe which provides for an active side stick to continue to provide tactile feedback to the pilots in the event that the Flight Control Computer is no longer able to provide an envelope protection function is highly desirable.

SUMMARY

Accordingly there is provided an inceptor apparatus for controlling a vehicle, in particular an aircraft, comprising: a control stick for operation by a user; a user feedback generator coupled to the control stick and configured to receive signals from a vehicle condition indicator remote from the inceptor apparatus; a first vehicle condition sensor dedicated to the operation of the inceptor apparatus; wherein in a first mode of operation, the user feedback generator is operable to generate tactile feedback to the user via the control stick in dependence upon signals received from the vehicle condition indicator; and, in a second mode of operation, in the event that no signal is received from the vehicle condition indicator, the user feedback generator is operable to generate tactile feedback to the user via the control stick in dependence upon signals received from the first vehicle condition sensor.

In a third mode of operation, the user feedback generator may provide no feedback to the user.

The first and second modes of operation may correspond to a vehicle condition which requires the user's input.

The third mode of operation may correspond to a vehicle condition in which the vehicle is being computer operated without the need for user intervention.

The first vehicle condition sensor may be configured to generate and deliver a signal indicative of vehicle attitude and/or speed.

In the second mode of operation, the user feedback generator may generate tactile feedback to the user via the control stick in dependence also upon signals received from a second vehicle condition sensor, wherein the first vehicle condition sensor is configured to generate a signal indicative of vehicle attitude and the second vehicle condition sensor is configured to generate and deliver a signal indicative of vehicle speed.

There may also be provided a vehicle control system comprising an inceptor apparatus according to the present disclosure.

The vehicle may be an aircraft, and the vehicle condition indicator may be a flight control computer (FCC) configured to generate a signal indicative of vehicle attitude and/or speed for the operation of the aircraft.

There may also be provided a method of operating an inceptor apparatus for a vehicle the method comprising the steps of: (i) determining if the vehicle is operating normally; (ii) based on the determination of step (i), providing tactile feedback to the user via a control stick coupled to a user feedback generator in dependence upon signals received from a vehicle condition indicator remote from the inceptor apparatus; or (iii) providing tactile feedback to the user via a control stick coupled to the user feedback generator in dependence upon signals from a vehicle condition sensor dedicated to the inceptor apparatus in the event that insufficient signal data is received from the vehicle condition indicator.

Hence there is provided an inceptor apparatus and vehicle control system with a failsafe which provides tactile feedback to a user even in the event of multiple system failures to inform the pilot of the vehicle's condition.

BRIEF DESCRIPTION OF THE DRAWINGS

Examples of the present disclosure will now be described with reference to the accompanying drawings, in which.

DETAILED DESCRIPTION

Figure 1:
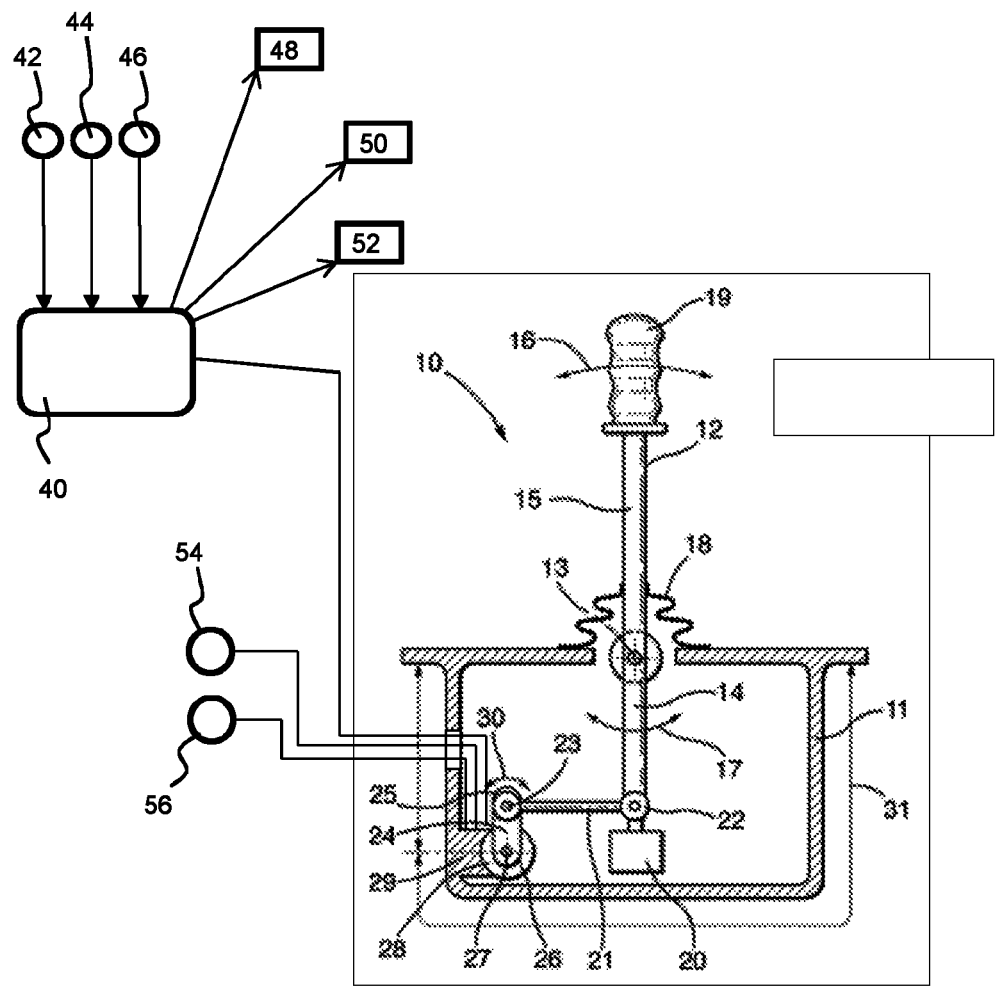
FIG. 1 shows an example of the component features of an inceptor apparatus according to the present disclosure.

FIG. 1 shows an example Active Controller Stick (ACS) (i.e. inceptor) apparatus 10 which forms part of a vehicle control system of the present invention. The inceptor comprises a stick housing 11 and a stick control member 12 (or "control stick", "side stick" or just "stick"), which are arranged such that the stick control member 12 is pivotally mounted to the stick housing 11 at pivot point 13. The pivot point 13 acts to divide the stick control member 12 into a first member section 14, contained within the stick housing 11, and a second member section 15, external to the stick housing 11. Normally, the stick housing 11 is fixed to a vehicle carrying the active stick apparatus 10. The pivot point 13 allows the stick control member 12 to pivot with respect to the stick housing 11, as indicated by directional arrows 16 and 17. The control stick 60 is pivotably mounted about the pivot point 13 such that it may move in at least one of a first direction and second direction, the second direction being at right angles to the first direction. The first direction may be an "x" direction (i.e. left and right, as shown in FIG. 1), or may be a "y" direction which is effectively in and out of the page as shown in FIG. 1. In this way, in use, the control stick may control an aircraft in pitch and roll directions.

A gaiter 18 can be provided between the second member section 15 and stick housing 11 to inhibit ingress of unwanted foreign material into the stick housing 11. At the one end of the second member section 15, distal from the pivot point 13, there is provided a grip 19 suitable for engagement by an operator of the active stick apparatus 10, so that the operator can move the stick control member 12 in either direction shown by directional arrow 16.

A solid mass 20 may be attached to the first member section 14 at an end distal from the pivot point 13. The solid mass 20 is arranged to act as a counter balance to movement of the stick control member 12 about pivot point 13 under external acceleration forces exerted on the stick control member 12 and associated grip 19.

Also attached to the first member section 14, between the solid mass 20 and the pivot point 13, is a first link 21. A first end 22 of the first link 21 is pivotally coupled to the first member section 14 and a second end 23 is pivotally coupled to a second link 24. The second link 24 being pivotally attached to the first link 21 at a first end 25 and a second end 26 of the second link 24 is fixedly attached to an output drive axle 27 of a servo motor 28. The servo motor 28 further comprises a housing 29 which is fixedly attached to the stick housing 11.

The above described features are of a conventional kind, but are included as context for the type of features a stick apparatus of the present disclosure may have. Of the above, the elements which must be present are a stick 15 coupled to an actuator, e.g. a servo motor 28. Additional or alternative features to those described above may also form part of the apparatus 10.

The servo motor 28 is operable to generate user feedback, and hence may also be referred to as a user feedback generator 28. The user feedback generator 28 is configured to receive signals from a vehicle condition indicator 40 which is remote from the inceptor apparatus 10. In this example, the vehicle is an aircraft and the vehicle condition indicator 40 is a Flight Control Computer configured to generate a signal indicative of the vehicle (i.e. the aircraft) attitude and/or speed for the operation of the aircraft. The Flight Control Computer 40 receives input from a plurality of sensors 42, 44, 46 and also may output signals containing various information to other parts of the aircraft indicated generally at 48, 50, 52 as shown in FIG. 1.

The Active Control Stick apparatus 10 comprises a first vehicle condition sensor 54 dedicated to the operation of the inceptor. Optionally, there may be provided a second vehicle condition sensor 56, which is also dedicated to the operation of the inceptor apparatus 10. That is to say, the vehicle condition sensors 54, 56 supply data only to the user feedback generator 28 and are independent of the rest of the vehicle control system. The vehicle condition sensor(s) 54, 56 may be provided external to the housing 11 of the inceptor apparatus 10, or may be provided inside the housing or on the inceptor structure. The vehicle condition sensors 54,56 may be provided as accelerometers. The vehicle condition sensors 54, 56 are configured to generate a signal indicative of vehicle attitude (that is to say indicative of, pitch, roll or yaw) or vehicle speed. In an example where there is provided only a single vehicle condition sensor, the sensor 54 may be configured to generate a signal indicative of vehicle attitude and/or speed. In examples where a second vehicle condition sensor 56 is provided, the first vehicle condition sensor 54 may be configured to generate and deliver a signal indicative of vehicle attitude, and the second vehicle condition sensor 56 may be configured to generate and deliver a signal indicative of vehicle speed.

The combination of Flight Control Computer 40 and the inceptor apparatus 10 provides a vehicle control system (or Flight Control System) according to the present disclosure.

Figure 2:
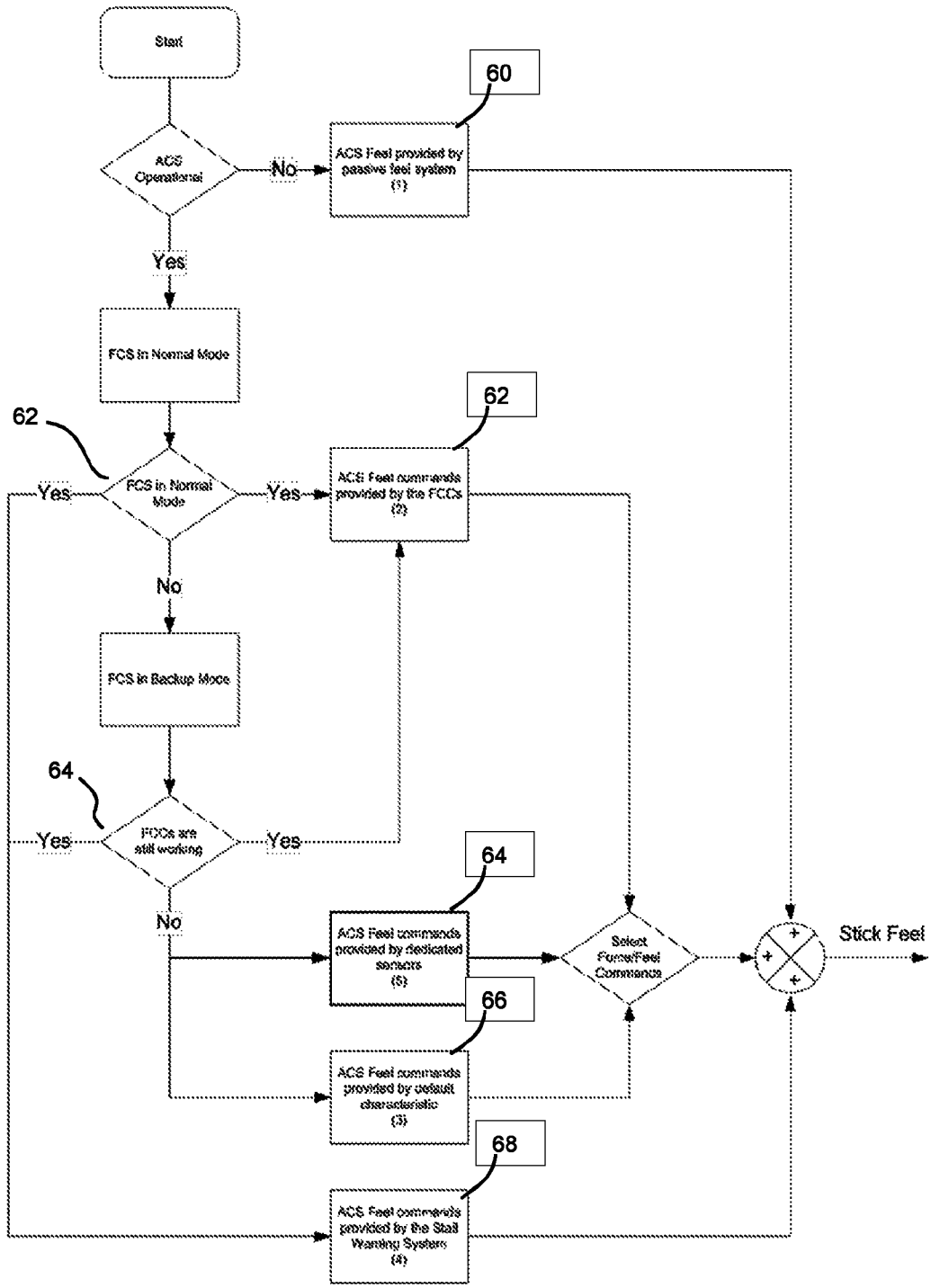
FIG. 2 is a flow diagram setting out control steps and determinations of the inceptor apparatus of the present disclosure.

The operation of the inceptor apparatus is summarised in the flow diagram set out in FIG. 2.

If the inceptor apparatus (i.e. Active Controller Stick) 10 is not operating, for example because the servo motor 28 is non operable, then the "feel" of the stick is determined by the geometry of the stick 15 and the mass 20, as defined by box 60 in FIG. 2. That is to say, a passive reversionary feel system is provided by springs and dampers. This provides minimum handling qualities in the event that power to the active side stick is lost. Put another way, if the user feedback generator 28 is not operational, the stick will operate as a passive mass balanced device.

If the Active Controller Stick apparatus 10 is operational, and the Flight Control System as a whole, including the Flight Control Computer 40, is operational, even if only in "backup" mode, then the "feel" of the stick 15 is controlled by the servo 28 in dependence upon signals received from the Flight Control Computer 40, as defined by box 62. The relevant force/feel commands are chosen to provide the correct feel dependent on the flight condition. That is to say, there is provided an active force/feel characteristic that is continuously updated by the Flight Control Computer 40 in real-time to reflect the current aircraft situation.

If the Active Controller Stick apparatus 10 is operational, and the Flight Control Computer 40 is not operational, or the signals from the Flight Control Computer 40 are not reaching the Active Controller Stick 10, then the "feel" of the stick 15 is controlled by the servo 28 in dependence upon signals received from the dedicated vehicle condition sensors 54,56, as defined by box 64. The relevant force/feel commands are chosen to provide the correct feel dependent on the flight condition. That is to say, the dedicated set of active side stick sensors 54, 56 are used to provide variable force/feel feedback to the pilots in the event that the Normal Mode force/feel commands from the Flight Control Computer are lost.

As defined by box 66, a default force/feel characteristic is implemented by the active side stick 10 in the event that force/feel commands from the Flight Control Computer are unavailable.

As defined by box 68, there is provided a discrete input command from the stall warning system that is used to operate a stick shaker function in the active side stick in the event that a stall condition is encountered.

Hence, in a first mode of operation, if the inceptor apparatus 10 is operational, and it is determined that the vehicle condition indicator 40 (i.e. Flight Control Computer) is operational, then the user feedback generator 28 is operable to generate tactile feedback to the user via the control stick 15 in dependence upon signals received from the vehicle condition indicator 40.

If in a second mode of operation, in the event that no signal is received from the vehicle condition indicator 40, either because it is not operating or there is an interruption of the signal between the Flight Control Computer 40 and the user feedback generator 28, the user feedback generator 28 is operable to generate tactile feedback to the user via the control stick 15 in dependence upon signals received from the first vehicle condition sensor 54.

The first and second modes of operation correspond to a vehicle condition which requires the users input. For example, in a case where the Flight Control Computer either is not able to deal with the situation and, or it is merely preferable for the user to deal with the situation.

In a third mode of operation, the user feedback generator provides no feedback to the user. The third mode of operation may correspond to a vehicle condition in which the vehicle is being computer operated without the need for user intervention.

The feedback generated by the servo motor 28 may be in the form of a "soft" limit. That is to say, the servo 28 may inhibit the user from moving the side stick 15 to a particular position outside of a safe operational envelope. Alternatively, a gradual increase in resistive force is applied to the stick 15 by the servo 28 as a limit is approached or passed. For example, the force needed to move an active side stick in the pitch axis can be increased by the Flight Control Computer as a function of airspeed, making it progressively more difficult for the pilots to input large commands as the airplanes speed increases. Similarly, an abrupt change in the side sticks force/feel characteristics (i.e. soft stops) can be introduced when a safe operating limit is reached e.g. when the aircraft is at a bank angle of 30 degrees. Soft stops let the pilot know that a limit has been reached, but allow the pilot to exceed the limit by applying additional force to push through it. In another example the feedback may be a "jump back". That is to say, the servo motor 28 moves the stick back from a position chosen by the user to a "safe" position. Alternatively the feedback may be a vibration, buzz, rap or judder, which is triggered when the user is instructing an unsafe manoeuvre.

If active inceptors are being operated as a pair of passive side sticks, the additional tactile feedback protection features may only be engaged in the event that the envelope protection features normally provided by the Flight Control Computer had been lost.

There is thus provided a method of operating an inceptor apparatus as described above for a vehicle, the method comprising the steps of first determining if the vehicle is operating normally; secondly, based on the determination of whether the vehicle is operating normally, providing tactile feedback to the user via a control stick coupled to the user feedback generator 28 in dependence upon signals received from a vehicle condition indicator (Flight Control Computer) 40 remote from the inceptor apparatus 10. The method further comprises the step of providing tactile feedback to the user via a control stick 15 coupled to the user feedback generator, in dependence upon signals from the vehicle condition sensor 54, 56 dedicated to the inceptor apparatus 10, in the event that insufficient signal data is received from the vehicle condition indicator (Flight Control Computer) 40.

As well as being able to vary the inceptors force/feel characteristics, the servo-actuator mechanism 28 in the Active Controller Side stick 10 also has the benefit of allowing two side sticks (for aircraft that have two flight crew stations) to be electrically linked (or coupled) together, such that movement of the pilot's side stick results in an identical movement of a First Officer side stick and vice versa. This linking is analogous to the way that conventional wheel and column inceptors are mechanically coupled together. Linking has the benefit of making each pilot aware of the others input.

The variable force/feel characteristic can be continuously varied throughout a flight, and hence this function can be used as part of the airplanes Flight Control System to provide tactile cues to the pilots that are pertinent to any chosen flight condition.

The inceptor apparatus above has been described in general for vehicle, but has particular efficacy in use in an aircraft.

Additionally, the active controller side stick 10 of the present disclosure may be configured to operate either as a fully active side stick, or as a simple passive side stick with fixed force/feel characteristics. In both cases a device of the present disclosure would allow a pilot and a first officer's side sticks to be electrically coupled together. That is to say, the active side stick controller 10 may be configured to operate as a passive side stick for normal operation, but could still have the capability to provide side-to-side linking and to warn the pilots if the control inputs being made would cause the aircraft to exceed a safe attitude and/or speed limit.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. An inceptor apparatus for controlling a vehicle, comprising:
   a control stick for operation by a user;
   a user feedback generator coupled to the control stick and configured to receive signals from a vehicle condition indicator remote from the inceptor apparatus, the signals from the vehicle condition indicator representing a condition of the vehicle; and
   a first vehicle condition sensor dedicated to the operation of the inceptor apparatus;
   wherein in a first mode of operation, in the event that the signals are received from the vehicle condition indicator, the user feedback generator is operable to generate tactile feedback to the user via the control stick in dependence upon the signals received from the vehicle condition indicator; and
   wherein in a second mode of operation, in the event that no signal is received from the vehicle condition indicator, the user feedback generator is operable to generate tactile feedback to the user via the control stick in dependence upon signals received from the first vehicle condition sensor.

2. The inceptor apparatus as claimed in claim 1 wherein, in a third mode of operation, the user feedback generator provides no feedback to the user.

3. The inceptor apparatus as claimed in claim 1, wherein the first and second modes of operation each correspond to a vehicle condition which requires the user's input.

4. The inceptor apparatus as claimed in claim 2, wherein the third mode of operation corresponds to a vehicle condition in which the vehicle is being computer operated without the need for user intervention.

5. The inceptor apparatus as claimed in claim 1, wherein the first vehicle condition sensor is configured to generate and deliver a signal indicative of at least one of vehicle attitude and vehicle speed.

6. The inceptor apparatus as claimed in claim 1, wherein, in the second mode of operation, the user feedback generator generates tactile feedback to the user via the control stick in dependence also upon signals received from a second vehicle condition sensor, wherein the first vehicle condition sensor is configured to generate a signal indicative of vehicle attitude and the second vehicle condition sensor is configured to generate and deliver a signal indicative of vehicle speed.

7. A vehicle control system comprising an inceptor apparatus as claimed in claim 1.

8. The vehicle control system as claimed in claim 7, wherein the vehicle is an aircraft, and wherein the vehicle condition indicator is a flight control computer (FCC) configured to generate a signal indicative of at least one of vehicle attitude and vehicle speed for the operation of the aircraft.

9. A method of operating an inceptor apparatus for a vehicle, the method comprising:
   determining if the vehicle is operating normally;
   in the event that signals are received from a vehicle condition indicator remote from the interceptor apparatus, providing tactile feedback to the user via a control stick coupled to a user feedback generator in dependence upon the signals received from a vehicle condition indicator, the signals from the vehicle condition indicator representing a condition of the vehicle; and
   in the event that no signal is received from the vehicle condition indicator, providing tactile feedback to the user via the control stick coupled to the user feedback generator in dependence upon signals from a vehicle condition sensor dedicated to the inceptor apparatus.

10. The method as claimed in claim 9, further comprising:
    in response to the vehicle being computer operated without the need for user intervention, providing no tactile feedback to the user via the control stick coupled to the user feedback generator.

11. The method as claimed in claim 9, further comprising:
    providing tactile feedback to the user via the control stick coupled to the user feedback generator in dependence upon signals from a second vehicle condition sensor;
    wherein the first vehicle condition sensor is configured to generate a signal indicative of one of vehicle attitude or vehicle speed, and the second vehicle condition sensor is configured to generate and deliver a signal indicative of the other one of vehicle attitude or vehicle speed.

12. The method as claimed in claim 9, wherein the vehicle is an aircraft, and the vehicle condition indicator is a flight control computer (FCC) configured to generate a signal indicative of at least one of vehicle attitude and vehicle speed for the operation of the aircraft.

13. An inceptor apparatus for controlling an aircraft, comprising:
    a user control stick;
    a first vehicle condition sensor; and
    a user feedback generator coupled to the control stick and including an actuator, wherein:
    in a first mode of operation, in the event that signals are received from an aircraft condition indicator remote from the inceptor apparatus, the user feedback generator is operable to generate tactile feedback via the control stick in dependence upon the signals received from the aircraft condition indicator, the signals from the aircraft condition indicator representing a condition of the aircraft; and
    in a second mode of operation, in the event that no signal is received from the aircraft condition indicator, the user feedback generator is operable to generate tactile feedback via the control stick in dependence upon signals received from the first vehicle condition sensor.

14. The inceptor apparatus as claimed in claim 13, wherein, in a third mode of operation, the user feedback generator provides no feedback, wherein the third mode of operation corresponds to an aircraft condition in which the aircraft is being computer operated without the need for user intervention.

15. The inceptor apparatus as claimed in claim 13, wherein the first and second modes of operation correspond to an aircraft condition which requires pilot input.

16. The inceptor apparatus as claimed in claim 13, wherein the first vehicle condition sensor is configured to generate and deliver a signal indicative of at least one of aircraft attitude and aircraft speed.

17. The inceptor apparatus as claimed in claim 13, wherein, in the second mode of operation, the user feedback generator generates tactile feedback to the user via the control stick in dependence also upon signals received from a second vehicle condition sensor, wherein the first vehicle condition sensor is configured to generate a signal indicative of one of aircraft attitude or aircraft speed, and the second vehicle condition sensor is configured to generate and deliver a signal indicative of the other one of aircraft attitude or aircraft speed.

18. An aircraft control system comprising an inceptor apparatus as claimed in claim 13.

19. The aircraft control system as claimed in claim 18, wherein the aircraft condition indicator is a flight control computer (FCC) configured to generate a signal indicative of at least one of aircraft attitude and aircraft speed for the operation of the aircraft.

20. The aircraft control system as claimed in claim 18, wherein the flight control computer (FCC) is further configured to receive data from one or more additional sensors.

* * * * *